United States Patent

[11] 3,603,338

[72] Inventors Howard B. Kast
Fairfield, Ohio;
Bruce S. Buckley, Berkeley, Calif.

[21] Appl. No. 17,187
[22] Filed Mar. 6, 1970
[45] Patented Sept. 7, 1971
[73] Assignee General Electric Company

[54] GAIN-COMPENSATING CONTROL COMPONENT
7 Claims, 5 Drawing Figs.

[52] U.S. Cl. .......... 137/83, 91/368
[51] Int. Cl. .......... F15b 9/06, G05d 16/00, G05d 13/00
[50] Field of Search .......... 137/83, 85, 86, 84, 82; 91/368

[56] References Cited
UNITED STATES PATENTS
3,465,768 9/1969 Martin .......... 137/86 X

*Primary Examiner*—Alan Cohan
*Attorneys*—Derek P. Lawrence, Thomas J. Bird, Jr., Lee H. Sachs, Frank L. Neuhauser, Oscar B. Waddell and Joseph B. Forman

ABSTRACT: A fluid control component is disclosed which has gain inversely proportional to pressure level $P_1$. The resulting function yields the desired gain compensation for control systems involving pressure and pressure ratio sensing. The gain compensator comprises a force balance servo in which a damping device comprising a pair of opposed compartments are each supplied with pressure $P_1$ through a tight restrictor.

INVENTORS.
HOWARD B. KAST
BRUCE S. BUCKLEY
BY
ATTORNEY

INVENTORS.
HOWARD B. KAST
BRUCE S. BUCKLEY
BY Loren W. Peters
ATTORNEY

GAIN-COMPENSATING CONTROL COMPONENT

BACKGROUND OF THE INVENTION

This invention relates to fluid control systems, and more particularly to dynamic compensation devices for such systems.

Fluid control systems can include one or more control elements whose gain is sensitive to the pressure level at which some element in the system operates. This gain variance must either be avoided, compensated for in some manner, or considered when designing the system dynamics to avoid system instability over the system operating range. If the system is designed to be stable at the highest value of the variable gain, accuracy at the low end thereof is compromised, and conversely, if accuracy at low gain is emphasized, stability at higher gains is compromised. Designing a system to avoid the dynamic effects of a variable gain component by substitution of alternate components or control techniques can often be difficult or impractical. It is highly desirable therefore that a pressure-sensitive gain compensation device be provided to compensate for gain variance of pressure-sensitive devices.

It is an object of this invention, therefore, to provide a relatively simple pressure-sensitive gain compensation device.

BRIEF DESCRIPTION OF THE INVENTION

Briefly stated, the invention is a control component which has gain inversely proportional to a pressure level, $P_1$. The gain compensator is a force balance servo having a forced-balanced pressure signal input means and a damping-force-generating means which comprises two opposed compartments separated by a bellows or flexible diaphragm. Each compartment of the damping-force-generating means is pressurized at $P_1$ and is connected thereto through a tight restrictor, thereby forming an "air spring" whose force displacement characteristic depends on $P_1$. The force displacement characteristic described combined with the dynamics created by the combination of restrictor resistance and compartment capacitance is characterized by a Bode plot which has a lag break dependent on $P_1$ and a lead break fixed by the physical constants of the gain compensator.

DESCRIPTION OF THE DRAWINGS

While the specification concludes with claims distinctly claiming and particularly pointing out the invention, it is believed that it will be more readily understood by reference to the discussion below and the accompanying drawings in which:

DESCRIPTION OF THE PREFERRED EMBODIMENT

Figure 1:
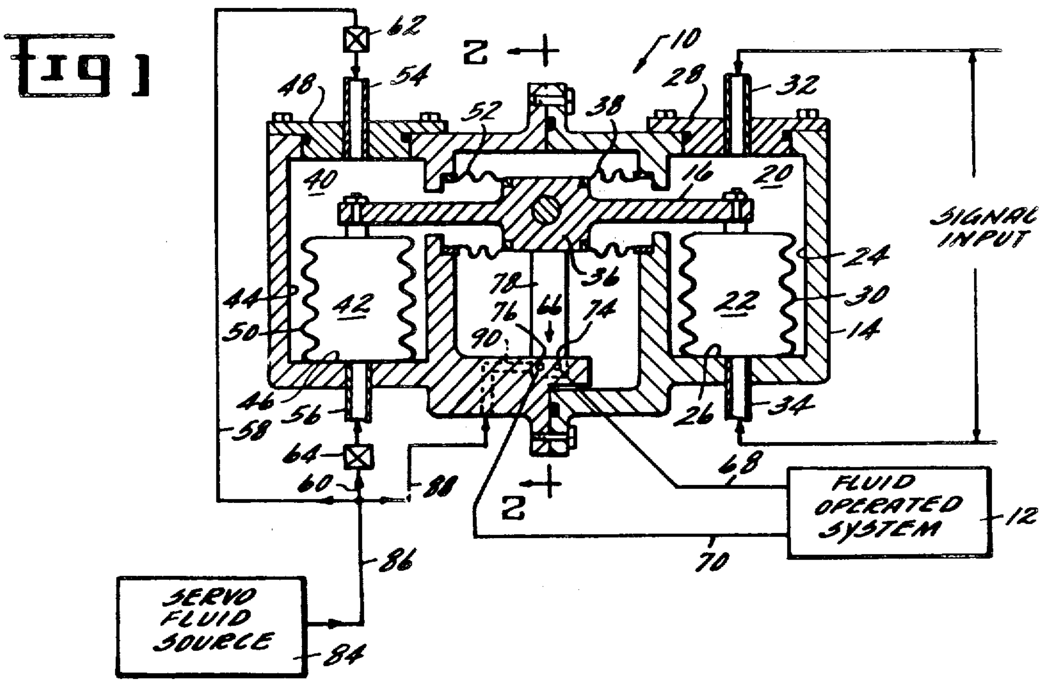
FIG. 1 is a partially sectional, partially schematic view of a fluid-operated control component.
Figure 2:
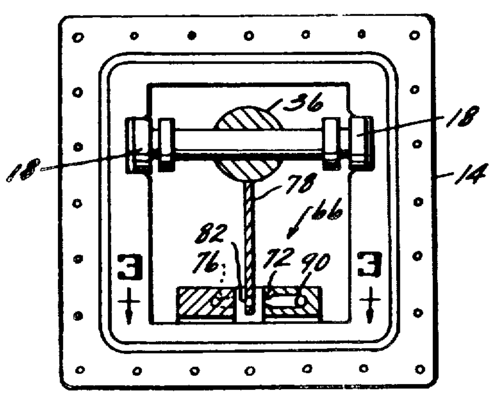
FIG. 2 is a sectional view taken along line 2—2 of FIG. 1.

FIG. 1 shows a fluidic control system which includes a gain compensator 10 and the various elements which can fluidtight. included in the synthesis of a fluid-controlled system 12. Gain compensator 10 comprises a housing 14 in which an error bar 16 is pivotally supported by pivot devices 18 (see FIG. 2). Two chambers 20, 22 are defined in housing 14 by walls 24 and 26, cover 28, and bellows 30, bellows 30 forming an impermeable barrier between chambers 20, 22. Error bar 16 extends into chamber 20 where it is mechanically fastened to bellows 30. An enlargement 36 in included on error bar 16 and serves as one base for a sealing bellows 38 which maintains chamber 20 fluidtight. Signal input ports 32, 34 open into the chambers 20, 22 respectively, and are adapted to to be connected to a control signal input.

An error bar damping means includes two compartments 40, 42 defined in the housing 14 by walls 44, 46, cover 48, and bellows 50, bellows 50 separating and partially defining the two compartments 40, 42. Error bar 16 extends into compartment 40 to a mechanical connection with bellows 50. A second sealing bellows 52 seals compartment 40 at the point of entry of error bar 16.

Pressure input ports 54, 56 open into compartments 40, 42 respectively and are interconnected by conduits 58, 60 respectively. Tight restrictors 62, 64 are respectively interposed in conduits 58, 60 and comprise very high flow resistance orifices or packages of orifices in series.

Figure 3:
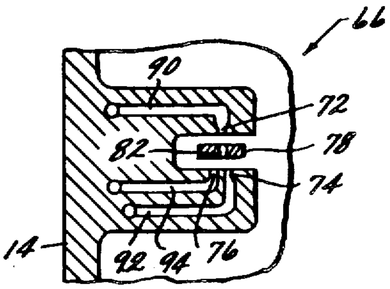
FIG. 3 is a sectional view taken along line 3—3 of FIG. 2.

A fluid signal output means 66 is connected to fluid-controlled system 12 by conduits 68, 70. The means 66 illustrated comprises a fluid jet nozzle 72 (see FIGS. 2–3), a pair of closely spaced receivers 74, 76 axially displaced from nozzle 72, and a diverter 78 interposed between nozzle 72 and receivers 74, 76. Diverter 78 comprises an arm attached to error bar 16 and having a hole 82 which is nominally aligned with nozzle 72. Motion of error bar 16 will cause hole 82 to move and affect the division of fluid issuing from nozzle 72 between the receivers 74, 76.

Nozzle 72 is supplied with pressurized fluid from a servo fluid source 84 by conduits 86, 88 and internal passageway 90. Receivers 74, 76 are connected to conduits 68, 70 by internal passageways 92, 94 (see FIG. 3).

Fluid source 84 can be a pressure regulated or nonregulated supply. To illustrate operation of the gain compensator 10, a nonregulated supply is shown whereby the pressure in passageway 90 will vary with supply pressure and result in a variable gain for output means 66. If the gain variance is very large, or if the control system 12 is highly gain sensitive, gain variance can adversely affect performance of the control loop, either by driving it into instability or by affecting its accuracy of the gain of the components comprising system 12 is kept low enough to allow for gain variance of output means 66. The invention compensates for this gain variance as a function of pressure as described below.

Figure 4:
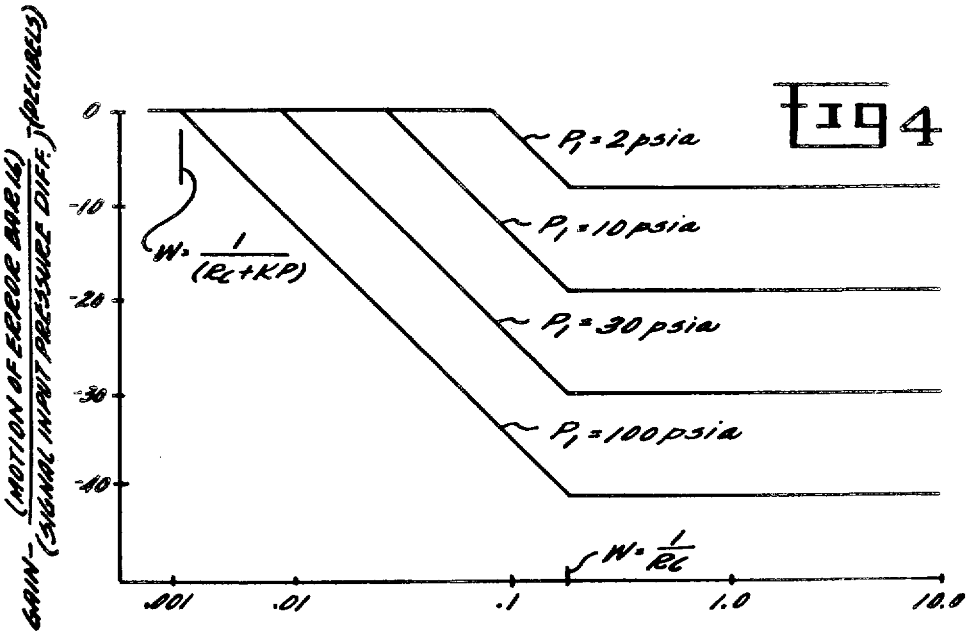
FIG. 4 is a Bode plot of the dynamic characteristic of a gain compensator.

The variable pressure source affecting component gain, in this case source 84, is connected to the resistance-capacitance network comprising compartments 40, 42, conduits 58, 60 and restrictors 62, 64. Compartments 40, 42 will thus be pressurized at the steady state pressure of source 84. Because of the high flow resistance of restrictors 62, 64 compartments 40, 42 will act as air springs against motion of error bar 16 and the resistance-capacitance network effect of compartments 40, 42 and restrictors 62, 64 will contribute to a lag-lead characteristic approximately by the Bode plot of FIG. 4. The numbers included in FIG. 4 are illustrative only inasmuch as the actual performance of a given device depends upon its particular physical characteristics. The ratio of error bar motion to a change in input signal is $\Delta P$ is attenuated as a function of sinusoidal input frequency. A lag break occurs at a frequency which is dependent upon the steady state pressure in compartments 40, 42, and a lead break occurs at a frequency which is the inverse of a time constant determined by the flow resistance of restrictors 62, 64 and the capacitance of compartments 40, 42. The amount of gain attenuation is inversely related to the pressure level for which compensation is made.

Figure 5:
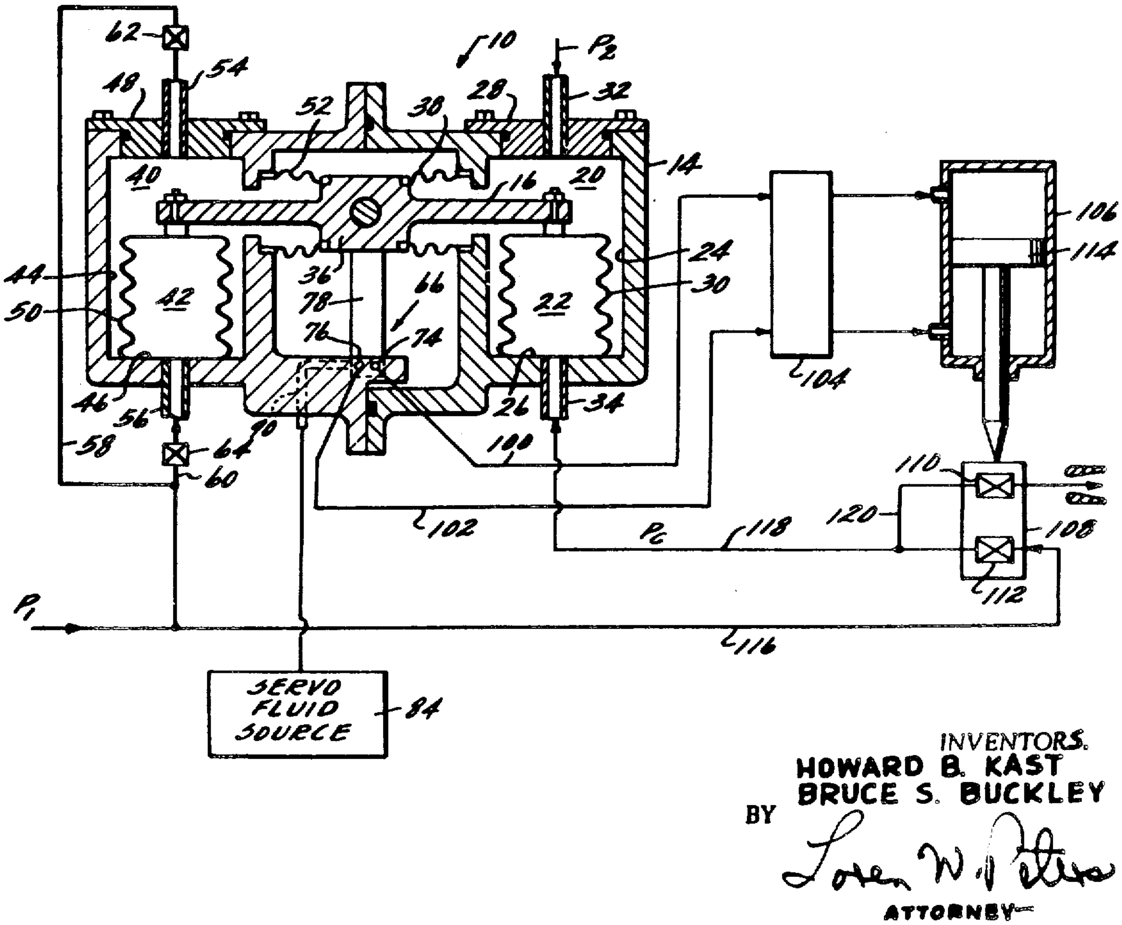
FIG. 5 is a partially sectional, partially schematic view of a fluid-operated control system.

The gain compensator 10 will compensate for a pressure-dependent gain variation of any one or more of several components in a control loop as long as the pressure which affects the gain of the component for which compensation is required is connected to the damping network comprising compartments 40, 42 and restrictors 60, 62. In this connection, FIG. 5 illustrates a more specific fluidic circuit wherein gain compensator 10 is combined with a pressure-ratio-sensing control loop. The pressure ratio sensor shown schematically is described more fully in the copending application filed by Thomas F. Urbanosky, Ser. No. 17,188 and assigned to the assignee of this application.

In FIG. 5, the output signal from gain compensator 10 is transmitted via conduits 100, 102 to an amplifier 104 and thence to an actuator 106. Actuator 106 powers a feedback valve 108 in which the area ratio of orifices 110, 112 is varied according to piston 114 position.

Orifice 112 is supplied with fluid at pressure $P_1$ from a suitable source via conduit 116. The exit side of orifice 112 is connected in parallel to input port 34 via conduit 118 and orifice 110 via conduit 120. Orifice 110 is made to operate choked so that the pressure ratio $P_c/P_1$ is a function of the ratio of the areas of orifices 110, 112. Pressure $P_c$ is balanced in compensator 10 against pressure $P_2$. The system therefore nulls at a piston 114 position where $P_c=P_2$. Inasmuch as the orifice 110, 112 area ratio is a function of $P_c/P_1$ and $P_c=P_2$, orifice area ratio, and thus piston 114 position, is representative of $P_2/P_1$.

Pressure $P_1$ may vary considerably throughout the range of operation of the device. The rate of change of $P_c$ with respect to orifice 112 area (i.e. gain of valve 108) is a direct function of pressure $P_1$, increasing with increasing $P_1$. To improve control loop accuracy with impairing stability, it is desirable to compensate for the pressure-dependent gain variance of valve 108. This compensation is accomplished by connecting $P_1$ to the damping network comprising compartments 40, 42 and restrictors 62, 64.

Other variations in application of the invention to accommodate the needs of other control loops will occur to persons skilled in the art, as will variations in construction of the gain compensator itself. Having above described two embodiments of the invention, what is desired to be secured by Letters Patent is claimed below.

What is claimed is:

1. A gain compensator comprising:
a housing, by a
fluid signal output means in said housing,
signal input means contained in said housing comprising at least one chamber defined in part by a moveable flexible member,
an error bar pivotally supported in said housing and connected to said moveable flexible member, said error bar being adapted to actuate the said fluid signal output means in response to motion of said moveable flexible member,
damping means comprising two compartments defined in said housing separated by and defined in part by a second moveable flexible member which is connected to said error bar, and two damping means input conduits adapted to connect each said compartment to a single fluid pressure for which gain compensation is desired, each said conduit including a tight restrictor interposed between said compartment and the source of said fluid pressure.

2. The gain compensator recited in claim 1 wherein said fluid signal means is adapted to provide a push-pull output and said signal input means comprises two chambers defined in said housing separated by and defined in part by a moveable flexible chamber, each said chamber having an input port for connection to a signal input source.

3. The gain compensator recited in claim 2 wherein said flexible member in said means is a bellows.

4. The gain compensator recited in claim 2 wherein the signal output means comprises a fluid jet nozzle defined in said housing, a pair of closely spaced receivers located in said housing on opposite sides of the said fluid jet nozzle and positioned in a spaced relation therewith, and diverting means interposed between said fluid jet nozzle and said receivers, said diverting means being physically connected to said error bar.

5. A gain compensated fluid-operated control system comprising:
interconnected control elements, at least one of whose response to a given fluid pressure is characterized by a gain increase as a function of increasing fluid pressure;
a gain compensator comprising
a housing,
an error bar pivotally mounted in said housing,
two sealed chambers defined in said housing and separated by a moveable flexible member, said flexible member being connected to said error bar,
two sealed compartments defined in said housing and separated by a second moveable flexible member, said second flexible member being connected to said error bar,
damping conduits connecting each of said compartments to the input side of the control element which is gain dependent on the said given fluid pressure, each said damping input conduit including a tight restrictor,
fluid signal output means responsive to motion of said error bar and interconnected with said control elements, and
input ports adapted to connect each sealed chamber to a fluid signal input.

6. The control system recited in claim 5 wherein the interconnected control elements form a pressure-ratio-sensing loop which includes a feedback valve whose gain is sensitive to the level of an input pressure $P_1$, and pressure $P_1$ is connected to said damping conduits.

7. The control system recited on claim 5 wherein the control element whose response to the said fluid pressure is characterized by gain dependency on pressure level is the said fluid signal output means comprising a fluid jet nozzle, and the said damping conduits are interconnected with the fluid jet nozzle.